(12) United States Patent
Siefert (10) Patent No.: US 6,578,278 B2
(45) Date of Patent: Jun. 17, 2003

(54) SADDLE PROTRACTOR

(75) Inventor: Vernon Ray Siefert, Du Quoin, IL (US)

(73) Assignee: Vernon Ray Siefert Revocable Trust, Duquoin, IL (US)

( * ) Notice: Subject to any disclaimer, the term of this patent is extended or adjusted under 35 U.S.C. 154(b) by 0 days.

(21) Appl. No.: 09/961,038

(22) Filed: Sep. 21, 2001

(65) Prior Publication Data

US 2003/0056383 A1 Mar. 27, 2003

(51) Int. Cl.$^7$ ................................................ B43L 7/027
(52) U.S. Cl. ............................................ 33/429; 33/476
(58) Field of Search ...................... 33/429, 474, 476, 33/479, 480, 481, 482, 483, 484, 485, 492, 613, 645, 562

(56) References Cited

U.S. PATENT DOCUMENTS

| | | | | |
|---|---|---|---|---|
| 653,229 A | * | 7/1900 | Gamble | 33/485 |
| 660,876 A | * | 10/1900 | West | 33/480 |
| 2,911,022 A | * | 11/1959 | Brown | 33/613 |
| 3,529,361 A | * | 9/1970 | Parsons, Jr. | 33/562 |
| 4,573,276 A | * | 3/1986 | Torczon | 33/481 |
| 5,771,597 A | * | 6/1998 | Hopf | 33/474 |

* cited by examiner

Primary Examiner—Christopher W. Fulton
(74) Attorney, Agent, or Firm—Polster, Lieder, Woodruff & Lucchesi, L.C.

(57) ABSTRACT

An angle measuring tool for us in combination with a standard framing square. A saddle protractor having a plurality of alignment tabs is engaged with a standard framing square by placing the saddle protractor in fact to face contact with the framing square and in alignment with the alignment tabs. Various incremental indicia on both sides of the saddle protractor depict angular measurements as measured from a pivot point on the saddle protractor. Other alignment tabs and pivot points on the saddle protractor also allow the saddle protractor to be used as a miter layout device to scribe various cutting angles on material having angular cuts.

25 Claims, 8 Drawing Sheets

SADDLE PROTRACTOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Technical Field

This invention relates in general to measuring devices and, more particularly, to an improved device for measuring roof rafter angles or other angles.

2. Description of Related Art.

Various measuring devices have been invented which provide a means to measure the angles of roof rafters and other types of angles which may occur in the construction industry. While many of those devices perform the required function of determining angles, those devices are normally cumbersome and complex. Such disadvantages are generally the result of designing a measuring device which is intended to work without taking advantage of the assistance that other tools may provide in measuring angles.

An example of this disadvantage is found in U. S. Pat. No. 4,712,307 for a rafter angle measuring device. That invention includes components which act as a framing square, ruler, and bubble level, as well as a rafter angle measuring device. Additionally, the invention includes a cumbersome arm which must be used to obtain a measurement of the angle of rafters. When not in use, the invention must be carefully folded and placed in a tool box for storage to ensure that the device is not damaged. The result of these characteristics is an invention which is cumbersome and which provides much more than is needed by a worker who simply wants to measure rafter angles or other types of angles.

U.S. Pat. No. 1,083,376 is another example of a measuring instrument that must work by itself to provide the worker with the measurement of rafter angles. This device also includes a number of capabilities other than the simple measurement of various angles and, as a result, the device is much more complex than it needs to be to simply measure angles.

Other measurement devices may be less cumbersome and less complex in design, yet fail to allow for the need to have long base lines to ensure that the measured angle is accurate. U.S. Pat. 4,742,619 discloses a roofing speed square for use in laying out and cutting roof rafters. However, the design of the device is intended to depend only upon the short adjacent sides of the device to establish the baseline for the angles being laid out and measured. Additionally, there is no provision for using the tool in conjunction with another device such as a large framing angle, to ensure that the base lines from which the angles are being measured are sufficient to guarantee angular accuracy. As a result, the invention suffers from being unable to provide accurate measurement of roof angles calculated from long base lines.

In each of these examples, the design of the measurement tool fails to provide an instrument which will allow the worker to measure rafter angles and other types of angles in a way which would permit the tool to be simple to use and which would allow the tool to be used in conjunction with another tool. Moreover, the designs of these tools do not permit the tools to be used in conjunction with another tool which could provide longer baselines for more accurate determination of angles.

Accordingly, it is an object of the invention to provide a measuring tool which is small and simple, and which can used with a standard framing square to allow a worker to measure and layout roof rafter angles and other types of angles.

It is yet another object of the invention to provide a measuring tool which, standing alone or in conjunction with a standard framing square, can be used to layout miter angles on materials which require angular cuts.

SUMMARY OF THE INVENTION

The present invention resides in a saddle protractor which can be used in conjunction with a standard framing square to measure rafter angles and other types of angles. Specifically, the invention discloses an angle measuring tool having angular graduations and which is designed to include various tabs which allow the tool to be securely engaged with the framing square. The saddle protractor includes a pivot pin or pivot tab which allows the device to be used as a miter layout device when used in conjunction with a framing square. One edge of the saddle protractor contains incremental graduations indicating angles in whole degree increments.

DESCRIPTION OF THE DRAWINGS

Corresponding reference numerals indicate corresponding parts throughout the several figures of the drawings.

DETAILED DESCRIPTION OF THE INVENTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
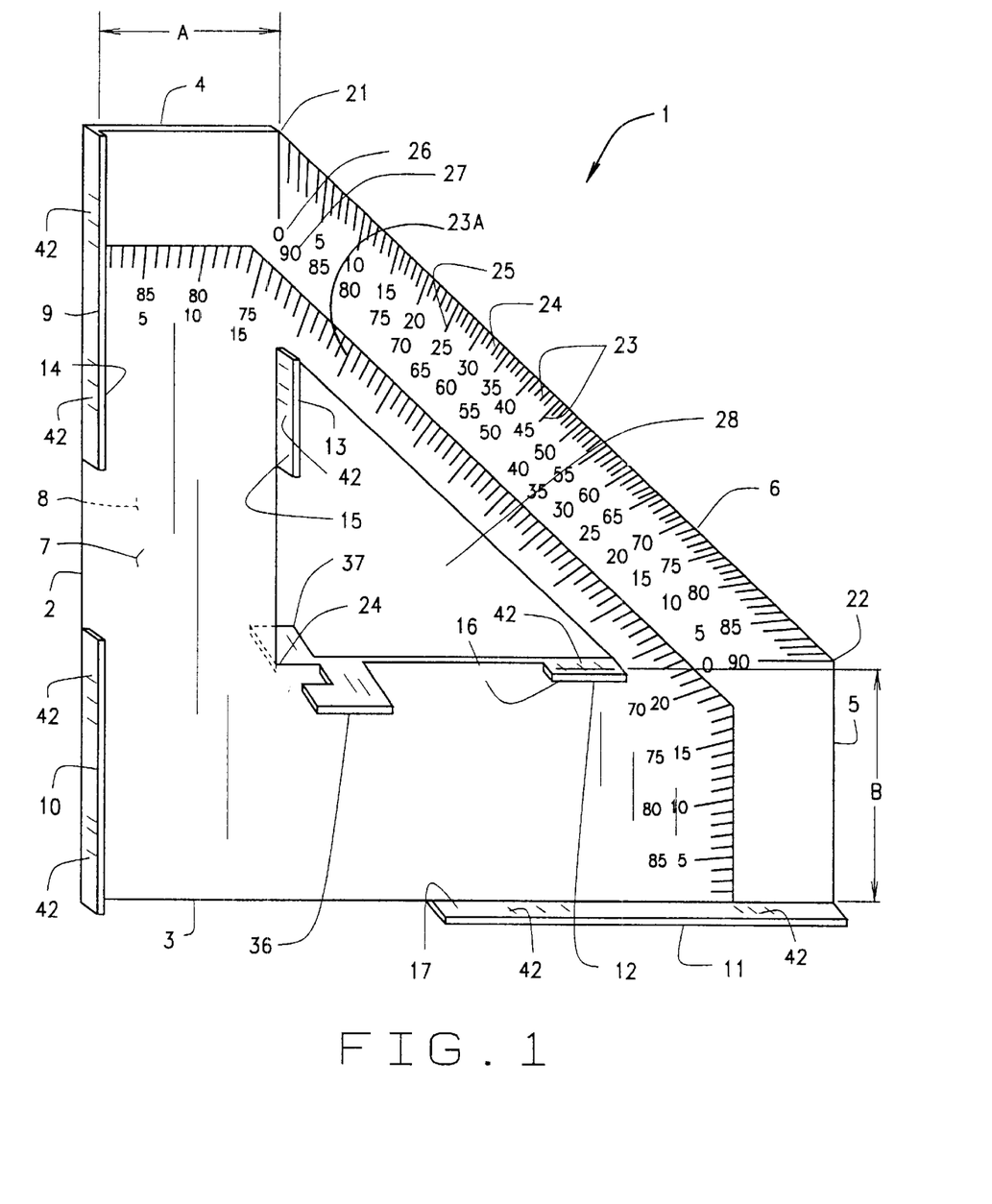
FIG. 1 is an isometric view of the saddle protractor showing one side of the protractor.

Referring now to FIG. 1, a first embodiment of a saddle protractor 1 is shown. The general shape of the saddle protractor 1 is that of a flat member having a right triangle with the acute corners of the right triangle being truncated. The resulting shape contains a first guide edge 2, a second guide edge 3, a first scaled edge 4, a second scaled edge 5, a third scaled edge 6, a top surface 7, and a bottom surface 8. The top surface 7 and the bottom surface 8 are generally parallel and generally perpendicular to edges 2, 3, 4, 5, and 6.

The saddle protractor also includes an alignment tab 9, an alignment tab 10, an alignment tab 11, an alignment tab 12, and an alignment tab 13. All alignment tabs 9, 10, 11, 12, and 13 are perpendicular to the top surface 7 and protrude upwardly from the top surface 7 to a height of about 0.12 inches to about 0.19 inches above the top surface. Each of the alignment tabs 9, 10, 11, 12, and 13 are generally rectangular in shape. A right triangular orifice 28 is located within the saddle protractor 1 such that the hypotenuse of the right triangle orifice is parallel with the third scaled edge 6.

A standard framing square 18 (FIG. 3) has two legs at right angles and each of the legs of the standard framing square are of different widths. The legs of the standard framing square range from 16.00 inches to 24.00 inches in length. In general, the shorter, narrower leg 19 of the framing square is about 1.50 inches wide and the longer, wider leg 20 of the framing square is about 2.00 inches wide. In the first embodiment of the present invention, the dimension A (FIG. 1) between the inner surface 14 of alignment tab 9 and the inner surface 15 of alignment tab 13 is about 1.50 to allow the shorter, narrower leg 19 of the standard framing square to fit between the inner surfaces 14 and 15, when the framing square is lying flat against the upper surface 7. The dimension B between the inner surface 16 of alignment tab 12 and the inner surface 17 of alignment tab 11 is about 2.00 inch to allow the longer, wider leg 20 of the standard framing square to fit between the inner surfaces 16 and 17 when the framing square is lying flat against the upper surface 7. The dimension A and the dimension B are such that the legs of the standard framing square fit snugly between their respective alignment tabs.

While the alignment tabs 9, 10, 11, 12, and 13 allow for a snug insertion of the standard framing square onto the saddle protractor 1, other means may also be used to enhance the tightness of the fit of the standard framing square with the saddle protractor. For example, the alignment tabs 9, 10, 11, 12, and 13 could be made with one or more dimples 42. The dimples 42 of one tab would be pointed toward the an opposing tab and would allow for a gentle clamping of the standard framing square 18 between the two opposing alignment tabs. It will be appreciated that in lieu of dimples, other means such as small protrusions can also be used to enhance the snugness of the standard framing square between the alignment tabs. Additionally, the alignment tabs could be positioned at an angle other than perpendicular to the tops surface 7 and toward the opposing alignment tab. The slight non-perpendicularity of the alignment tabs would thus act to encapsulate and grip the edges of the standard framing square when the framing square is engaged with the saddle protractor 1. Various other methods may be used as long as the method selected acts to increase the strength of the engagement between the saddle protractor 1 and the framing square 18.

The top surface 7 near the scaled edge 6, and between corner 21 and corner 22, is scribed with indicia 23 to indicate the value of a measured angle. The indicia 23 are in at least one degree angular increments as measured across the edge 6 from the pivot point 24. The indicia 23 begins with a horizontal mark at the corner 12 indicating 0 degrees and commences with additional marks 24 in at least one degree increments and continuing clockwise toward the corner 22 until the vertical mark indicating 90 degrees is reached. The intersection of the horizontal 0 degree mark and the vertical 90 degree mark of the marking indicia 23 is the angular center point of the marking indicia 23.

Intermingled within the one degree increment indicia 24 are longer indicia marks 25 which are located at every five degree increment. The longer indicia marks 25 are shown onto the top surface 7 by a plurality of first numeric markings 26 which begin with the number 0 at corner 21 and increment in five unit intervals until the value of the first numeric markings reaches 90 at the corner 22. Just beneath the first numeric markings 26, a plurality of second numeric markings 27 are also scribed onto the top surface 7. However, the second numeric markings 27 are opposite in sequence and direction from the first numeric markings such that the second numeric markings begin with the number 0 at the corner 22 and increment in five unit intervals until the value of the second numeric markings reaches 90 at the corner 21.

The saddle protractor 1 includes a right triangular orifice 28 located within the exterior area of the saddle protractor. The right triangular orifice 28 is located within the saddle protractor 1 such that the corner 24 of the right triangular orifice 28 is positioned at the intersection of the 0 degree horizontal mark and 90 degree vertical mark of the marking indicia 23.

A second set of indicia 23A is similar to the marking indicia 23, but extends from the inner surface 14 to the inner surface 17. The second set of indicia 23A includes numeric markings similar to the first numeric markings 26 and the second numeric markings 27 for marking indicia 23.

A first miter tab 36 protrudes upwardly from the top surface 7 to a height of about 0.50 inches from the top surface. The first miter tab 36 is generally rectangular and is positioned to be perpendicular to the top surface 7. A second miter tab 37 extends in the opposite direction of the first miter tab 36 and protrudes downwardly from the bottom surface 8 and along the same plane as the first miter tab 36. The second miter tab 37 is also generally rectangular in shape.

Figure 2:
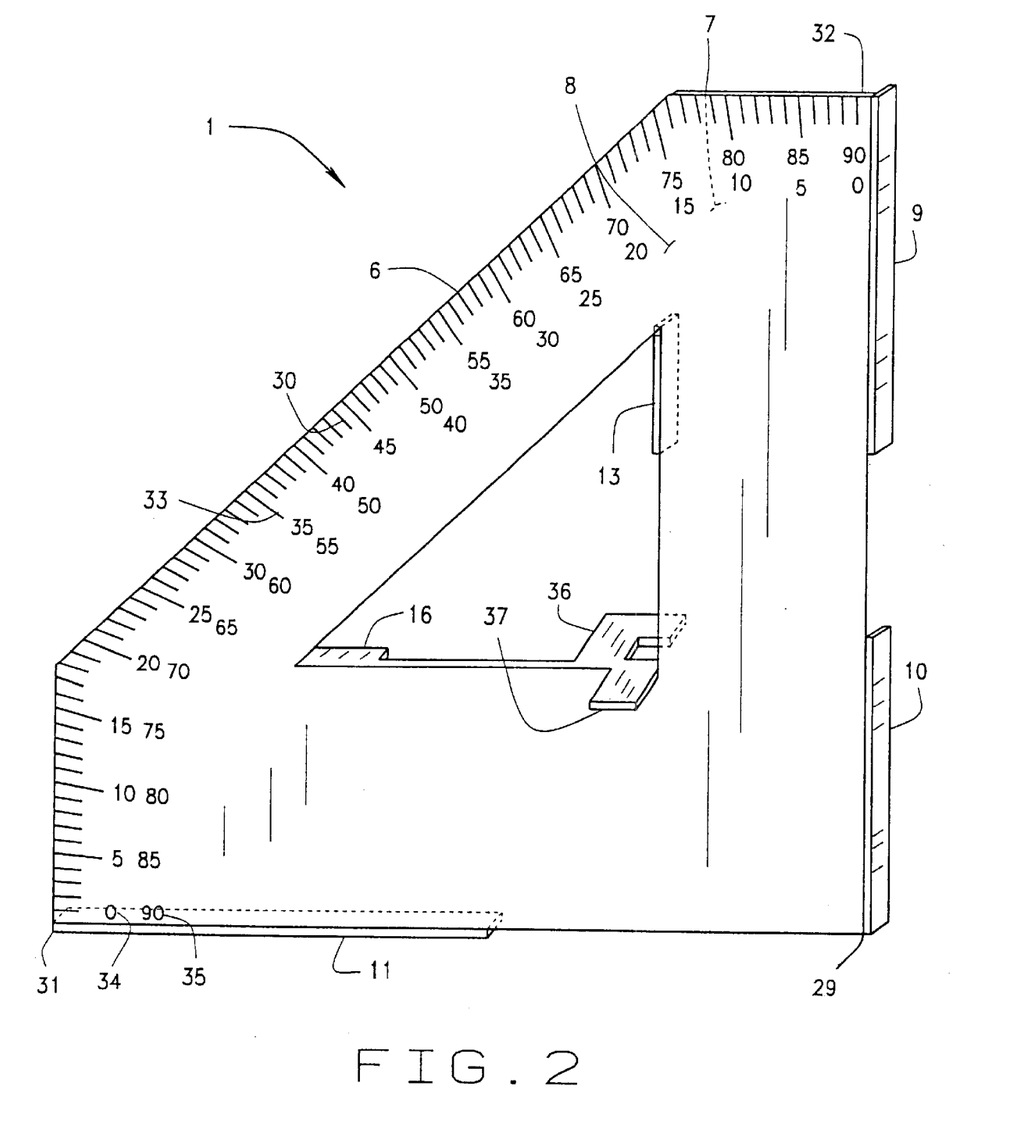
FIG. 2 is an isometric view of the saddle protractor showing the other side of the protractor.

In FIG. 2, the surface 8 on the back side of the saddle protractor 1 is also scribed with indicia to indicate the value of a measured angle. However, unlike the numeric markings on the top surface 7, the indicia 30 are in at least one degree angular increments as measured across the edge 6 from the corner 29 of the saddle protractor. The indicia 30 begins at the corner 31 and commences with additional indicia in at least one degree increments and continuing clockwise toward the corner 32 until the 90 degree increment is reached. Intermingled within the one degree increment indicia 30 are longer indicia marks 33 which are located at every five degree increment. The longer indicia marks 33 are shown on the bottom surface 8 by a plurality of third numeric markings 34 which begin with the number 0 at the corner 31 and increment in five unit intervals until the value of the third numeric markings reaches 90 at the corner 22. Just beneath the third numeric markings 26, a plurality of fourth numeric markings 35 are also scribed onto the bottom surface 8. However, the fourth numeric markings 35 are opposite in sequence and direction from the third numeric markings 34 such that the fourth numeric markings begin with the number 0 at the corner 32 and increment in five unit intervals until the value of the fourth numeric markings reaches 90 at the corner 31.

Figures 5, 5B:
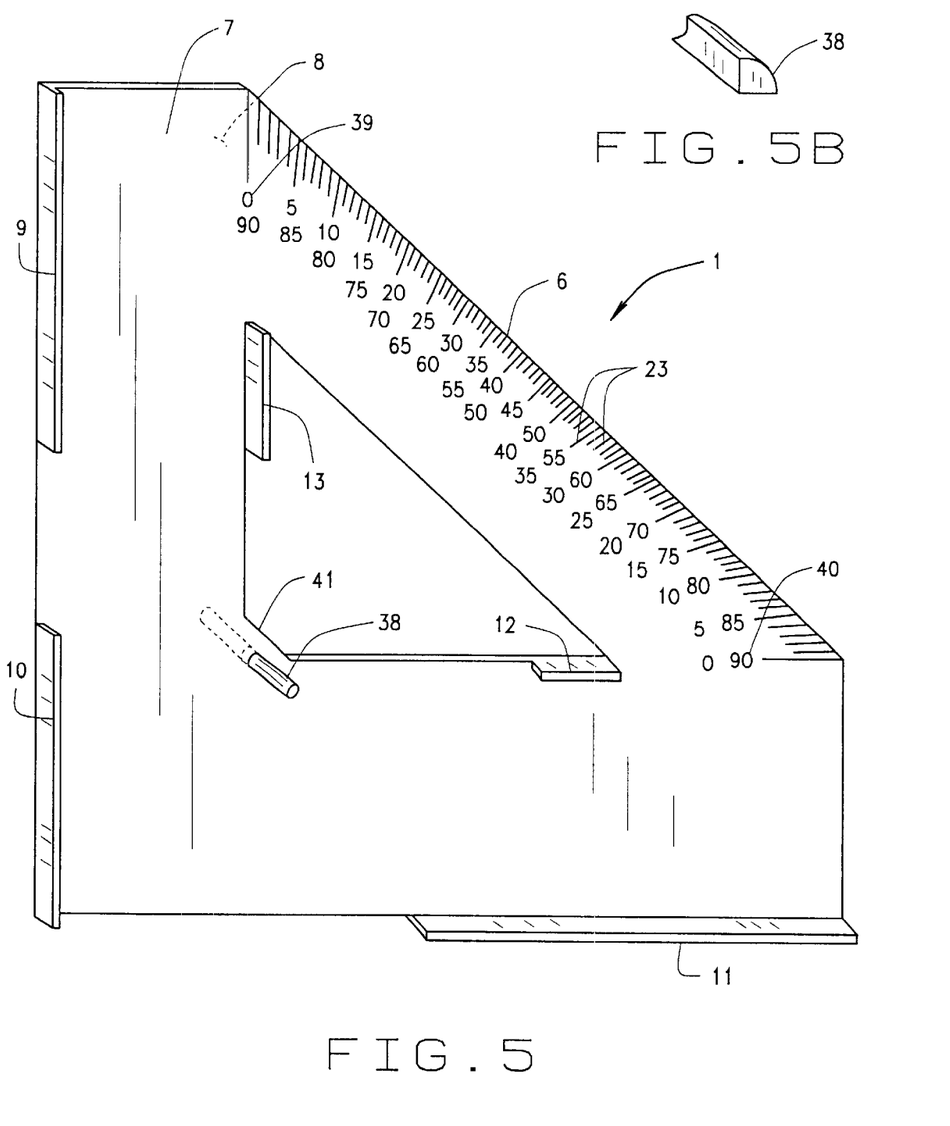
FIG. 5 is an isometric view of the saddle protractor showing a third embodiment of the protractor.
FIG. 5B is an isometric view of an alternate embodiment of the guide pin used on the third embodiment of the saddle protractor.

A second embodiment of the present invention is shown in FIG. 5. The second embodiment is the same as the first embodiment except the first miter tab 36 and the second miter tab 37 are not used. Additionally, a guide pin 38 is mounted perpendicular to the top surface 7. The guide pin 38 is located at the pivot point of the indicia 30 which is at the intersection of the vertical indicia of 0 degrees and the horizontal indicia of 90 degrees and extends about 0.50 inches above the top surface 7 and likewise extends about 0.50 inches above the bottom surface 8. Additionally, the right triangular orifice 28 of the saddle protractor 1 is modified such that the right angle corner of the right triangular orifice is modified to add a gusset 41 into the right angle corner. FIG. 5B shows an alternate construction of the guide pin 38.

The use of guide pin 38 is an alternate embodiment of the saddle protractor because the design of some framing squares prevents the use of first miter tab 36 and second miter tab 37. One type of framing square 18 is made so that the internal angle of the framing square is simply the intersection of the interior edges of the two legs 19 and 20 of the framing square. In other types there is a circular notch at the intersection point of the interior edges of the framing square. The first and second miter tabs 36 and 37 allow the use of the saddle protractor 1 when there is no notch in the framing square 18, while the guide pins 38 and 42 of the alternate embodiment of the saddle protractor allow it to be used with a framing square 18 which has the circular notch.

Figures 4, 4A:
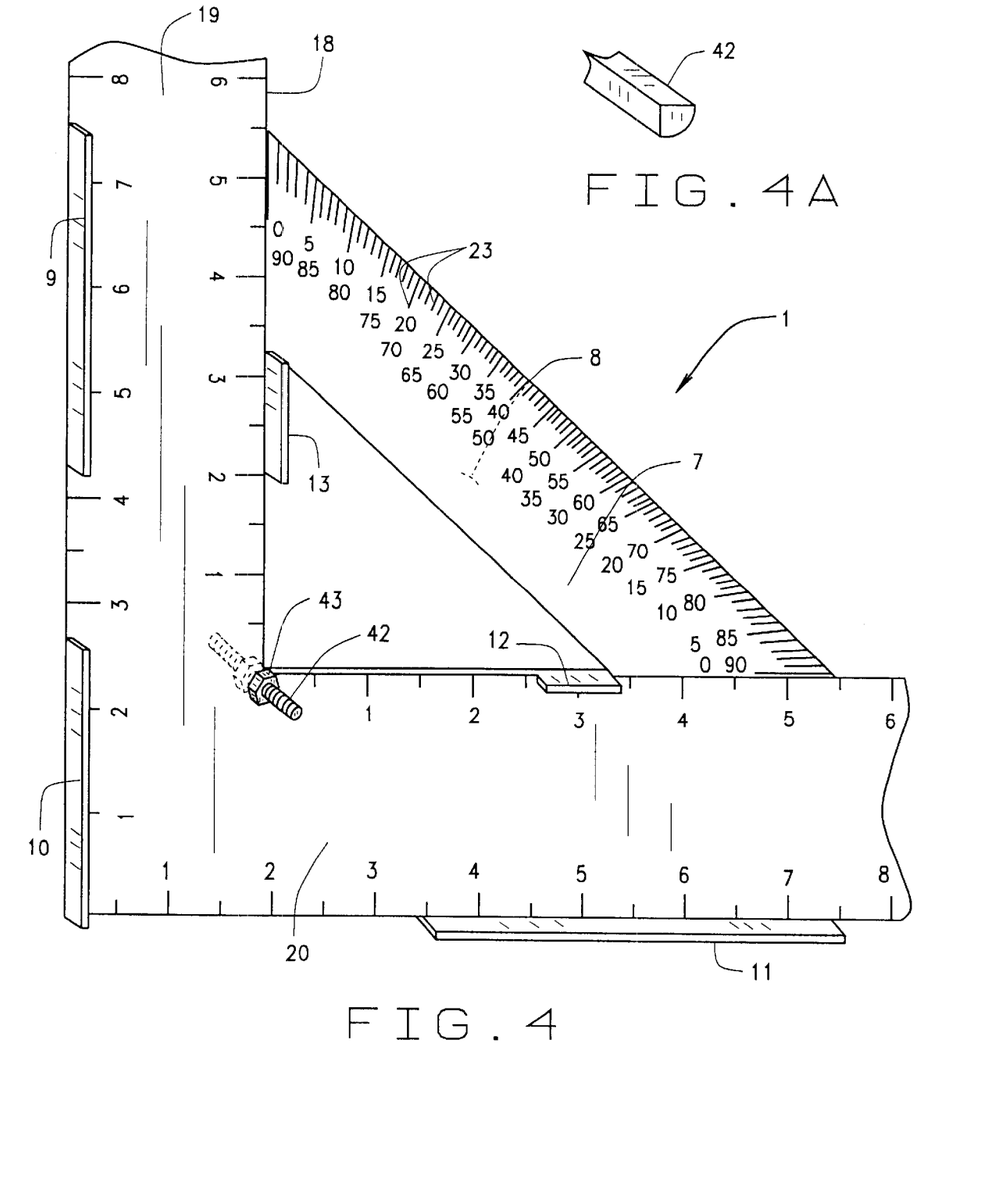
FIG. 4 is an isometric view of the saddle protractor showing a second embodiment of the protractor.
FIG. 4A is an isometric view of an alternate embodiment of the guide pin used on the second embodiment of the saddle protractor.

A third embodiment of the present invention is shown in FIG. 4. The third embodiment is also the same as the first embodiment except that the third embodiment does not have a first miter 36 or a second miter tab 37. Additionally, the third embodiment includes a threaded pivot pin 42 which is mounted perpendicular to the top surface 7 and the bottom surface 8, and extends above each of those surfaces about 0.75 inches. Two nuts 43 are installed onto the threaded pivot pin 42, with one nut tightened against the top surface 7 and the other nut tightened against the bottom surface 8. FIG. 4A shows an alternate construction of the pivot pin 38.

Figure 3:
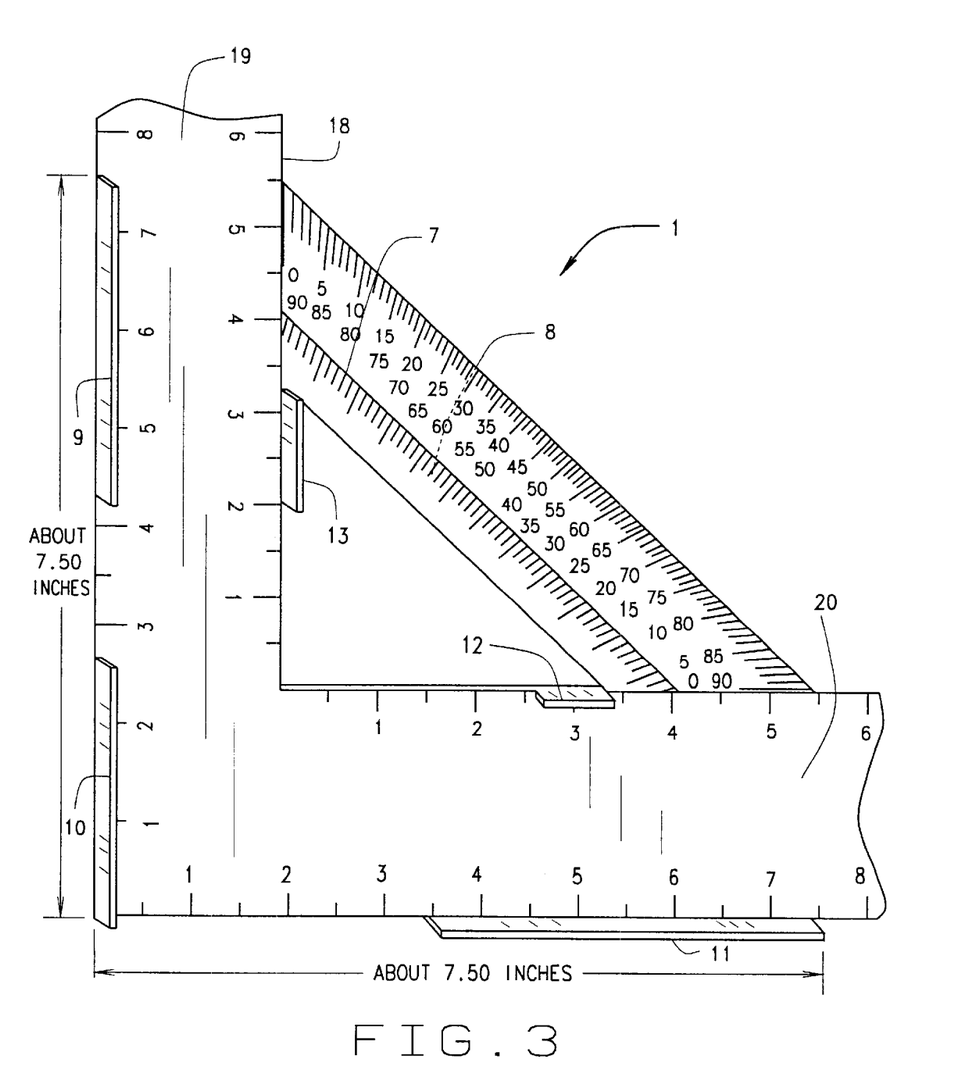
FIG. 3 is an isometric view of the saddle protractor showing use of the protractor with a standard framing square.

The saddle protractor is intended to be used with a standard framing square 18 as shown in FIG. 3. To measure the angle of a roof rafter or other type of angle, the standard framing square 18 is engaged with the saddle protractor 1 by placing one face of the standard framing square against the top surface 7 of the saddle protractor. As the standard framing square 18 is placed against the top surface 7, the inside edges of the framing square and the outside edges of the framing square come into contact with the inner surfaces of the alignment tabs 9, 10, 11, 12, and 13. Due to the snug fit, the framing square 18 is held in place between the alignment tabs, and the framing square 18 and the saddle protractor 1 become coupled to function as a single tool. In alternate embodiments of the saddle protractor 1, the dimples 42 or other types of protrusions on the alignment tabs act to enhance the snugness of the fit between the saddle protractor and the framing square 18. In yet another embodiment of the saddle protractor 1, the alignment tabs are bent over at slightly more than a perpendicular angle to position the alignment tabs to embrace the framing square 18.

Figure 6:
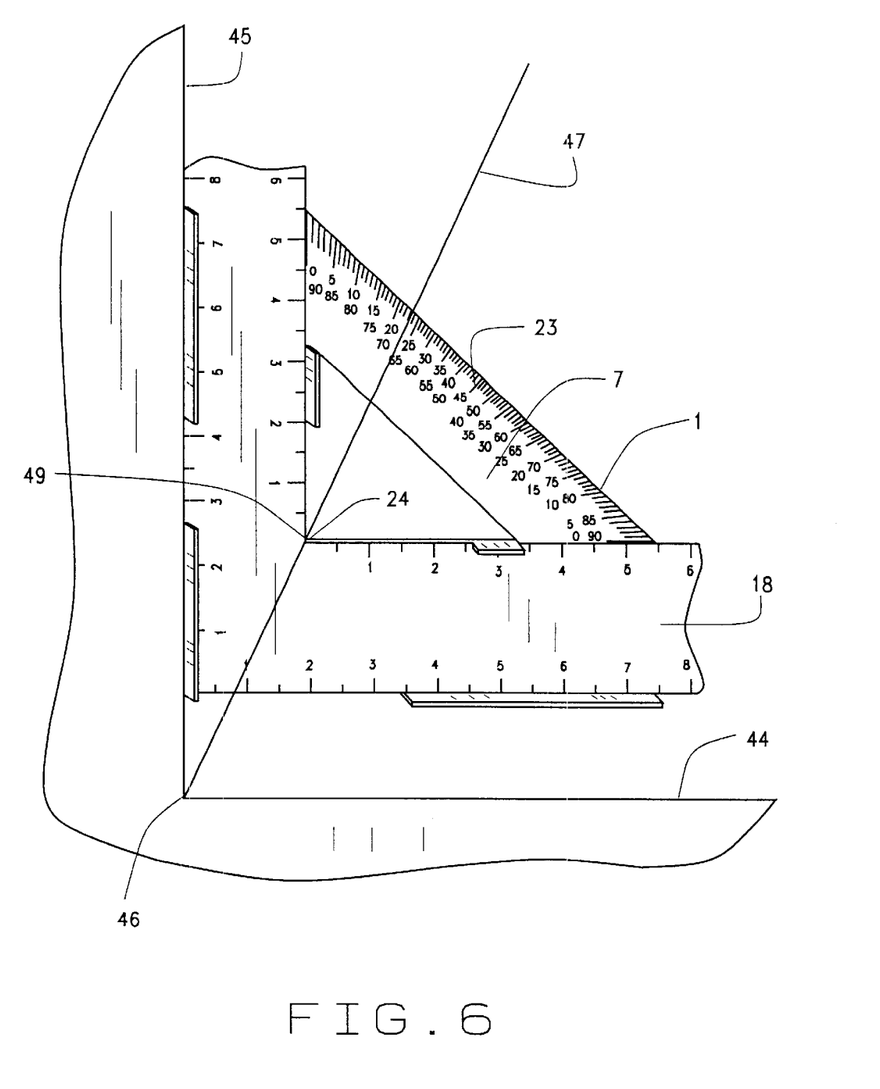
FIG. 6 is a plan view of the saddle protractor showing the use of the protractor in measuring angles from the corner of two adjacent walls using the indicia on the top surface of the saddle protractor.

FIG. 6 shows a method of engaging the saddle protractor 1 with the framing square when the third embodiment of the saddle protractor 1 as shown in FIG. 5 is used. Prior to the coupling of the framing square 18 with the saddle protractor 1, the nut 43 which is tightened against the top surface 7 is loosened. The framing square 18 is then positioned to allow one face of the framing square to be in contact with the top surface 7. Once in this position, the framing square 18 is captivated against the saddle protractor 1 by tightening the nut 43 onto the threaded rod 42 so as to clamp the framing square 18 against the saddle protractor 1.

In operation, FIG. 6 shows the method by which the combination of the saddle protractor 1 and framing square 18 can be used to measure an angle set from the corner of a room using the saddle protractor 1. A first wall 44 and second wall 45 intersect at a corner 46. After the saddle protractor 1 is engaged with the framing square 18, the framing square is placed against the wall 45 such that the longer leg 20 of the framing square abuts the surface of the wall. A string line 47 is connected to the corner 46 and the string line is stretched between the corner 46 and a point in the room for which an angle is to be measured. The framing square 18 and saddle protractor 1 are then slid along the surface of the wall 45 until the string line 47 intersects with the pivot point 49 which is at the corner 24 of the saddle protractor. The angle the string line 47 makes with either the wall 45 or the wall 44 is determined by reading the marking indicia 23 on the top surface 7 of the saddle protractor 1.

Figure 7:
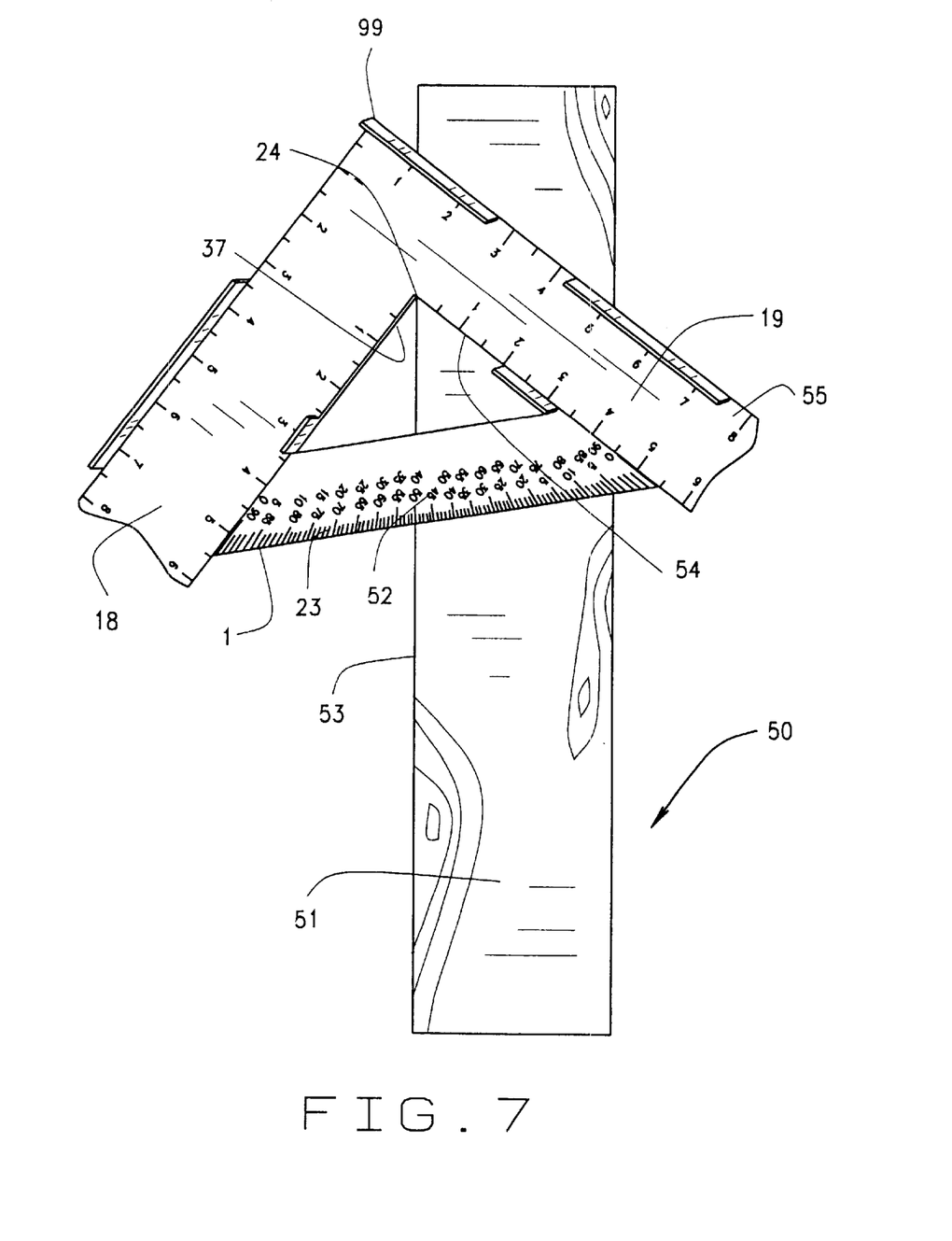
FIG. 7 is a plan view of the protractor showing the use of the protractor as a tool for laying out miter cuts using the indicia on the top surface of the saddle protractor.

After the saddle protractor 1 has been engaged with the framing square 18 as described above, FIG. 7 shows how the saddle protractor 1 may be used to lay out miter cuts on building materials such as a board 50. In this figure, the saddle protractor 1 is used to lay out a miter cut of 45 degrees. The saddle protractor is laid on the surface 51 of the board 50 such that the indicia 23 on the top surface 7 of the saddle protractor 1 is facing away from the surface 51 of the board 50. The saddle protractor 1 is then positioned on the surface 51 of the board 50 such that the pivot tab 37 located at the corner 24 of the saddle protractor touches the edge 53 of the board 50. The saddle protractor 1 is then pivoted about the pivot tab 37 until the edge 53 of the board 50 aligns with the indicia 23 that shows an angle of 45 degrees at marking 52. The miter line 54 is then placed onto the surface 51 by scribing a line onto the surface of the board 50 by running a marking device of some type along the edge 55 of the framing square 18. As can be seen, this method can be used to lay out angles other than 45 degrees by simply rotating the saddle protractor around the pivot tab 37 until the required angular degree on the indicia 23 aligns with the edge 53 of the board 50.

To layout a miter line on the other side of board 50, the saddle protractor 1 with the framing square 18 are positioned on the other of the board 50 after the saddle protractor has been flipped over to expose side 7 of the protractor. The indicia 23A (FIG. 1) are then used to determine the angle to be scribed. It should be noted that when the saddle, protractor 1 uses a guide pin such as guide pin 42 (FIGS. 4 & 4A) or guide pin 38 (FIGS. 5 & 5B), the post can be position on the saddle protractor 1 such as to eliminate the need to flip the saddle protractor 1 over to layout a miter line on the other side of the board 50.

As another embodiment of the saddle protractor 1, a removable clip could be use in lieu of the miter tabs 36 and 37, and the guide pin 38 and 42. The removable clip would be constructed to slide onto the saddle protractor 1 near the point where the miter tabs 36 and 37 are located. When laying out a miter line from the opposite edge of the board 50, the removable clip can be removed from the saddle protractor 1, the removable clip is then rotated 180 degrees and then replaced onto the saddle protractor 1. Because the protruding tab from the removable clip is now protruding from the other side of the saddle protractor 1, the removable clip allows the saddle protractor to be pushed against the edge of the board 50 to layout the required miter line.

Figure 8:
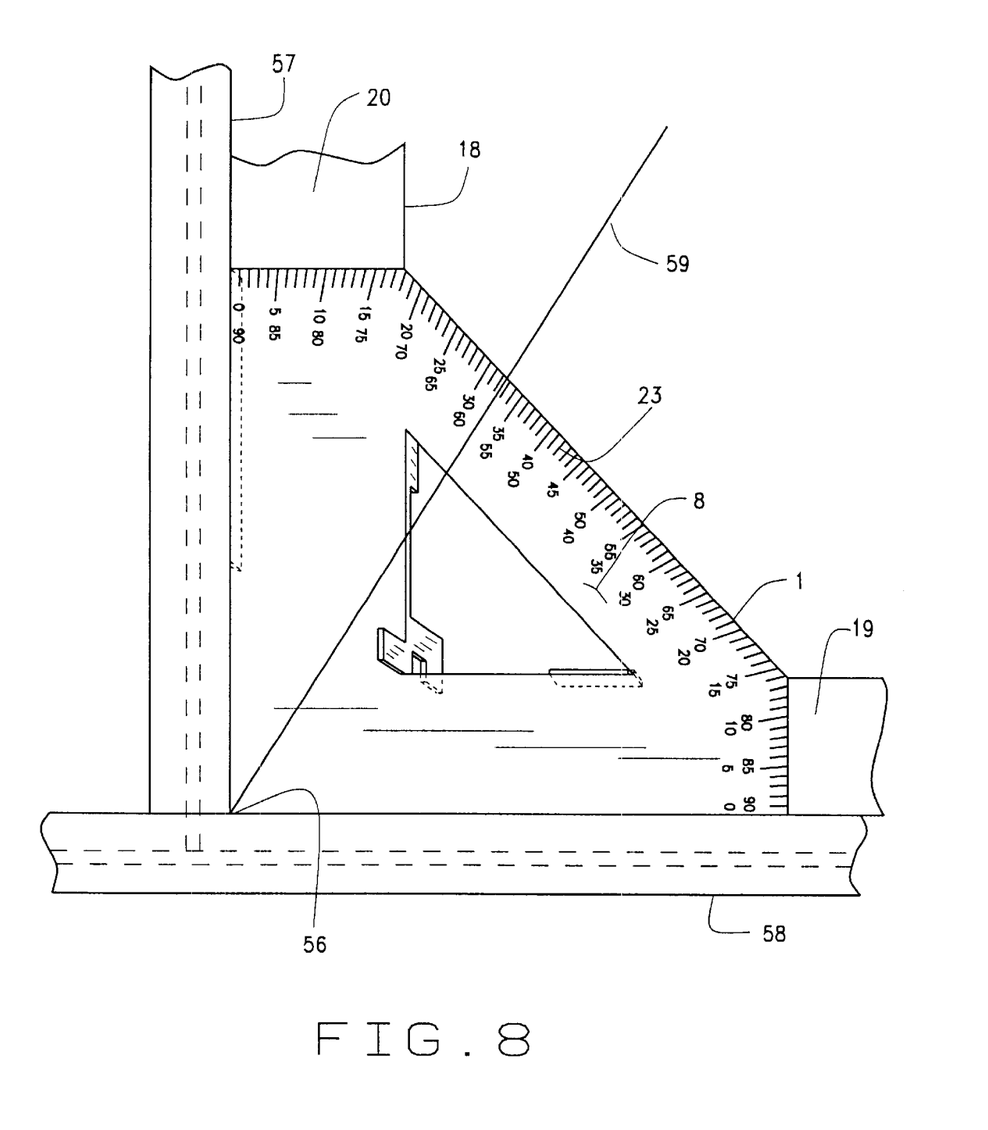
FIG. 8 is a plan view of the saddle protractor showing the use of the protractor to measure the roof rafter angles in a steel beam construction using the indicia on the bottom surface of the protractor.

FIG. 8 shows how the saddle protractor 1 can be used to measure the roof rafter angle in a structural steel building construction. After the saddle protractor 1 has been engaged with the framing square 18 as described above, the framing square is placed into the corner 56 at the intersection of I beam 57 and I beam 58. The edges of the legs 19 and 20 are placed into contact with the edges of the I beams 57 and the I beams 58. A string line 59 is positioned at the corner 56 of the saddle protractor 1 and the string line is tightened and positioned so that the other end of the string line is located at the point from which the roof angle is to be measured. The roof rafter angle can be found by reading the indicia 23 where the string line 59 crosses the bottom surface 8 of the saddle protractor 1.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense. Additionally, while several methods of angle measurement are described herein, these methods are simply samples of the types of processes by which the saddle protractor is capable of measuring angles in various situations and it will be clear to one skilled in the art that the saddle protractor is capable of measuring angles in any situation where angles must be measured from any flat surface or corner.

What is claimed is:

1. An angle measuring tool, comprising:
   a flat member having a top surface and a bottom surface, the flat member having the shape of a right triangle having a hypotenuse and two adjacent sides;
   a first plurality of marking indicia on the top surface;
   a second plurality of marking indicia on the bottom surface;
   a third plurality of marking indicia on the top surface; and
   a plurality of alignment tabs protruding upward from the top surface, the plurality of alignment tabs being generally perpendicular to the top surface, the plurality of alignment tabs also being spaced a distance apart such as to accommodate a standard framing square.

2. The angle measuring tool of claim 1 further including a first miter tab protruding outward from the top surface and a second miter tab extending outward from the bottom surface.

3. The angle measuring tool of claim 1 further including a guide pin, the guide pin extending outward from the top surface and outward from the bottom surface, the guide pin being mounted perpendicular to the top surface and the bottom surface, the guide pin being located at an angular center point of the first plurality of marking indicia.

4. The angle measuring tool of claim 3 wherein the first plurality of marking indicia includes a first set of angular marking indicia on the top surface, the first set of angular marking indicia being in at least one degree increments as measured from the angular center point.

5. The angle measuring tool of claim 4 wherein the first plurality of marking indicia further includes a first set of numeric markings on the top surface and coinciding with the first set of angular marking indicia to indicate the value of a measured angle as measured from the angular center point, the first set of numeric markings beginning at a first vertical 0 degree marking and continuing clockwise from the angular center point in at least five degree angular increments to end at a first horizontal 90 degree marking.

6. The angle measuring device of claim 5 wherein the first plurality of marking indicia further includes a second set numeric markings on the top surface, the second set of numeric markings being opposite in numeric sequence from the first set of numeric markings such that the second set of numeric markings begins with a first horizontal 0 degree marking and continuing counterclockwise from the angular center point in at least one degree increments to end at a first vertical 90 degree marking, the second set of numeric markings being located to coincide with the first set of numeric markings.

7. The angle measuring tool of claim 6 wherein two non-right triangle corners of the flat member are truncated.

8. The angle measuring tool of claim 6 wherein the plurality of alignment tabs include a set of dimples to assist the alignment tabs in grasping a framing square.

9. The angle measuring tool of claim 6 further including a removable clip which can be attached to the saddle protractor at a right angle corner of a right triangular orifice, the right triangular orifice being located within the interior of the angle measuring tool such that the right corner of the right triangular orifice is positioned at the angular center point of the first plurality of marking indicia, the right triangular orifice being located in the angle measuring tool such that a hypotenuse of the right triangular orifice is parallel to the hypotenuse of the flat member.

10. The angle measuring tool of claim 3 wherein the second plurality of marking indicia includes a second set of angular marking indicia on the top surface, the second set of angular marking indicia being in at least one degree increments as measured from a right angle corner of the flat member.

11. The angle measuring tool of claim 10 wherein the second plurality of marking indicia further includes a third set of numeric markings on the top surface and coinciding with the second set of angular marking indicia to indicate the value of a measured angle as measured from the right angle corner of the flat member, the third set of numeric markings beginning at a second vertical 0 degree marking and continuing clockwise from the right angle corner of the flat member in at least five degree angular increments to end at a second horizontal 90 degree marking.

12. The angle measuring device of claim 11 wherein the second plurality of marking indicia further includes a fourth set of numeric markings on the top surface, the second set of numeric markings being opposite in numeric sequence from the third set of numeric markings such that the fourth set of numeric markings begins with a second horizontal 0 degree marking and continuing counterclockwise from the right angle corner of the flat member in at least one degree increments to end at a second vertical 90 degree marking, the fourth set of numeric markings being located to coincide with the third set of numeric markings such that the third set of numeric markings and the fourth set of numeric markings identify the same second set of angular marking indicia.

13. The angle measuring tool of claim 12 wherein two non-right triangle corners of the flat member are truncated.

14. The angle measuring tool of claim 12 wherein the plurality of alignment tabs include a set of dimples to assist the alignment tabs in grasping a framing square.

15. The angle measuring tool of claim 12 further including a removable clip which can be attached to the saddle protractor at a right angle corner of a right triangular orifice, the right triangular orifice being located within the interior of the angle measuring tool such that the right corner of the right triangular orifice is positioned at the angular center point of the first plurality of marking indicia, the right triangular orifice being located in the angle measuring tool such that a hypotenuse of the right triangular orifice is parallel to the hypotenuse of the flat member.

16. The angle measuring tool of claim 3 wherein the third plurality of marking indicia includes a third set of angular marking indicia on the bottom surface, the third set of angular marking indicia being in at least one degree increments as measured from the right triangle corner of the flat member.

17. The angle measuring tool of claim 16 wherein the third plurality of marking indicia further includes a fifth set of numeric markings on the bottom surface and coinciding with the third set of angular marking indicia to indicate the value of a measured angle as measured from the right angle corner of the flat member, the fifth set of numeric markings beginning at a third horizontal 0 degree marking and continuing counterclockwise from the angular center point in at least five degree angular increments to end at a third vertical 90 degree marking.

18. The angle measuring device of claim 17 wherein the third plurality of marking indicia further includes a sixth set numeric markings on the bottom surface, the sixth set of numeric markings being opposite in numeric sequence from the fifth set of numeric markings such that the sixth set of numeric markings begins with a third vertical 0 degree marking and continuing clockwise from the right angle corner of the flat member in at least one degree increments to end at a third horizontal 90 degree marking, the sixth set of numeric markings being located to coincide with the fifth set of numeric markings.

19. The angle measuring tool of claim 18 wherein two non-right triangle corners of the flat member are truncated.

20. The angle measuring tool of claim 18 wherein the plurality of alignment tabs include a set of dimples to assist the alignment tabs in grasping a framing square.

21. The angle measuring tool of claim 18 further including a removable clip which can be attached to the saddle protractor at a right angle corner of a right triangular orifice, the right triangular orifice being located within the interior of the angle measuring tool such that the right corner of the right triangular orifice is positioned at the angular center point of the first plurality of marking indicia, the right triangular orifice being located in the angle measuring tool such that a hypotenuse of the right triangular orifice is parallel to the hypotenuse of the flat member.

22. A method of measuring angles comprising the steps of:

placing a framing square onto an angle measuring tool having a plurality of angular marking indicia and a plurality of alignment tabs to align the framing square with the angle measuring tool; and using the angle measuring tool in conjunction with the framing square to measure angles from one of either an apex of a right triangular corner of a triangular orifice within the angle measuring tool or a right triangular outside corner of the angle measuring tool.

23. An angle measuring tool, comprising:

a right-triangular shaped flat member having a hypotenuse side, an exterior right triangle corner, and a flat surface;

a right triangular orifice, the right triangular orifice having a hypotenuse side and an interior right triangle corner, the right triangle orifice being located within the interior of the angle measuring tool such that the hypotenuse side of the right triangular orifice is parallel to the hypotenuse side of the flat member and the right triangle orifice being centered on the flat member;

means for measuring angles from about 0 degrees to about 90 degrees as measured from the exterior right triangle corner of the flat member; and means for measuring angles from about 0 degrees to about 90 degrees as measured from the interior right triangle corner of the right triangular orifice.

24. The angle measuring tool of claim 23 further including an alignment means for aligning a framing square onto the top surface of the flat member.

25. The angle measuring tool of claim 24 further including means for pivoting the flat member to layout miter cuts.

* * * * *

UNITED STATES PATENT AND TRADEMARK OFFICE
CERTIFICATE OF CORRECTION

PATENT NO.      : 6,578,278 B2                                               Page 1 of 1
DATED           : June 17, 2003
INVENTOR(S)     : Vernon Ray Siefert It is certified that error appears in the above-identified patent and that said Letters Patent is hereby corrected as shown below:

<u>Column 7,</u>
Line 40, replace the word "bottom" with -- top --
Line 42, replace the word "top" with -- bottom --

Signed and Sealed this

Second Day of December, 2003

JAMES E. ROGAN
*Director of the United States Patent and Trademark Office*